The present invention relates generally to echo pulse range finding devices, such as pulse radar systems and the like. Specifically, it is a range tracking circuit for said echo pulse devices which splits an electrical signal pulse, characteristic of an object or target echo pulse, on its time axis to provide an exact and predetermined time reference along the signal pulse time axis for facilitating accurate range tracking of the object or target or measuring of object range.

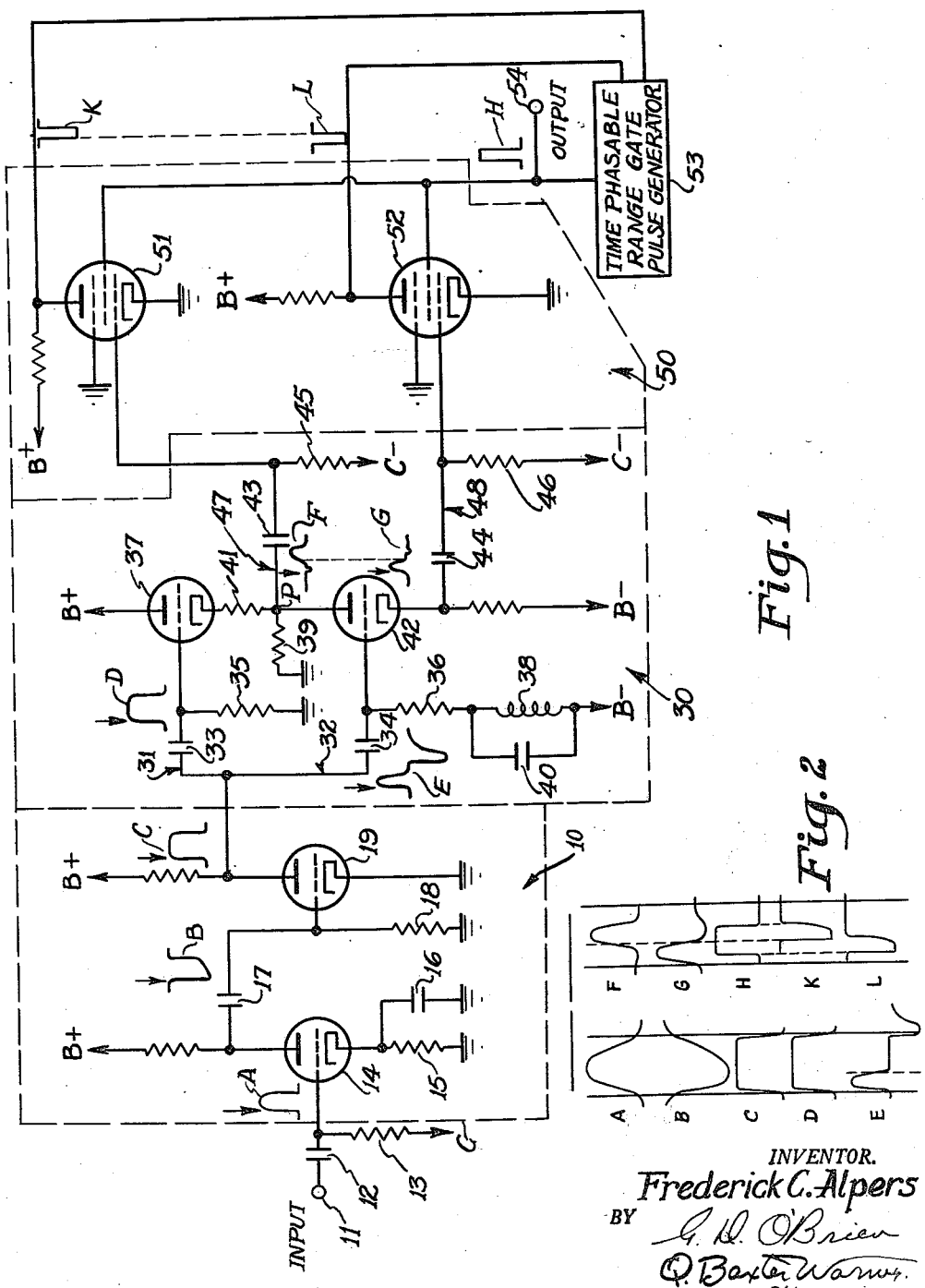
INVENTOR.
Frederick C. Alpers 3,078,456
SPLIT SIGNAL TRACKING CIRCUIT
Frederick C. Alpers, Washington, D.C., assignor to the United States of America as represented by the Secretary of the Navy
Filed June 12, 1951, Ser. No. 231,242
10 Claims. (Cl. 343—7.3)
(Granted under Title 35, U.S. Code (1952), sec. 266)

In the art of echo pulse target tracking, as utilized for gun directing purposes or for the purpose of guiding homing missiles, it is in many instances essential that the range tracking of the target be of a high order of accuracy. To this end numerous range tracking circuits have been designed for use in conjunction with echo pulse locating systems. However, the range tracking circuits heretofore known in the art have been characterized by certain limitational disadvantages. For example, if the selected target presents an appreciable range depth to the echo pulse locating device, the received echo pulse reflected by the target necessarily has a correspondingly great width along its time axis. Accurate range tracking in this situation is difficult unless the range tracking circuit can be referenced to a discrete point on the received pulse time axis. Another disadvantage of conventional range tracking circuits is related to the foregoing disadvantage, in that the target being tracked may itself transmit energy pulses of comparatively long time duration having the same character as and synchronized with the energy pulse reflections at the target resulting from the transmissions of the echo pulse locating device, to produce received pulses of undesirably long time duration in the echo receiver, thereby making accurate range tracking just as difficult, if not more difficult, than in the preceding instance of a target presenting great range depth to the echo receiver.

The range tracking circuit comprising the present invention overcomes the foregoing disadvantages and difficulties found in conventional range tracking circuits by providing a means for selecting a discrete point along the time axis of the received pulse as the range tracking reference, thus enabling highly accurate range tracking regardless of the echo or received energy pulse time duration or of variations therein.

In its more general aspects, the present range tracking circuit overcomes the above-mentioned disadvantages of conventional circuits by splitting an electrical signal pulse characteristic of the received energy pulse into two time phase components, the first component in time having its leading edge in time phase with the leading edge of the received energy pulse and its characteristic signal pulse, and continuing for a determined time period, the second component in time commencing substantially in time phase with the completion of the first pulse component and extending for the remaining time duration of the received pulse. These two pulse components are then separately channeled, and the time phase of the split is compared with the time phase of a range gate or range indicating pulse of fixed time duration. If the range gate pulse is in time coincidence with a trailing portion of the early pulse component and an equal leading portion of the late component, the range gate is indicating the correct target range. However, as the target range varies, a greater portion of one of said received pulse components comes into time coincidence with the range gate pulse and a lesser portion of the other received pulse component retains coincidence therewith. The resultant discrepancy in time relationship of the two pulse components with the range gate pulse is measured, and the time phase of this pulse is adjusted to bring it into equal coincidence with the two signal pulse components, thus providing a corrected measure of target range. Since the range gate pulse is thus caused to track the received energy pulse, or its equivalent signal pulse, at a selected point along its time axis related to the received pulse's leading edge, the accuracy of the tracking measurements is related solely to the leading edge of the received energy pulse and is not affected by the time duration thereof.

It is, therefore, one object of the present invention to provide a highly accurate object or target range tracking circuit.

Another object of the present invention is to provide a split signal object or target range tracking circuit for use in conjunction with echo pulse range finding systems, whereby some point of known time relationship to the echo pulse's leading edge is utilized as the tracking reference.

Another object of the present invention is to provide an object or target range tracking circuit for use in conjunction with echo pulse range finding systems, which splits the received energy pulse, or an electrical signal pulse characteristic of the received pulse, into two time components, thereby enabling accurate object or target range tracking with the received signal split as the tracking reference.

Other objects and advantages of the present invention will become apparent to those skilled in the art from a consideration of the following detailed description thereof, had in conjunction with the accompanying drawings in which:

FIG. 1 is a schematic diagram of a preferred embodiment of the present split signal range tracking circuit, and FIG. 2 presents in graphical form the time phase interrelationships of the waveforms of FIG. 1.

For purposes of explanation, this accompanying circuit diagram has been divided into several sections. The section generally indicated by the numeral 10 is a signal pulse shaping unit, into which an electrical signal pulse of the general shape indicated by the waveform A is fed. This signal pulse characterizes in phase, form, amplitude, and duration the received echo energy pulse reflected by the object or target being tracked, and from this signal pulse a square wave pulse output having the general shape of the waveform C is obtained. The leading edge of the shaping unit's output C is in time phase with the leading edge of the signal pulse A, and the widths of these two pulses along their time axes are substantially identical. The shaping unit's output is applied to the signal pulse splitting unit generally indicated by the numeral 30. In this latter unit, the square wave pulse output C is applied to two electrically parallel channels 31 and 32. The pulse traveling channel 31, as indicated by the waveform D, is passed on in toto to point P with substantially no alteration; whereas the pulse traveling channel 32 is differentiated and applied to a capacitance-inductance peaking circuit to provide an output pulse from this channel at point P of fixed time duration, which is established to be less than that of the pulse traveling channel 31. The two pulses thus applied to point P are in currentwise opposition to each other, and therefore that leading portion of pulse D in time coincidence with the output of channel 32 is cancelled at point P. As a result thereof, a pulse of waveform F is transmitted along channel 47, having its leading edge time delayed from the leading edges of pulses A, B, C, and D by the time duration of the output of channel 32, as established by the positive portion of the pulse indicated by the waveform E. Simultaneously, a second output from channel 32 is obtained along channel 48, again corresponding to the positive pulse of waveform E. Thus, the initial signal pulse A, after being shaped into square waveform C, is split into two components F and G, of which the leading edge of pulse component G is in time phase with the leading edge of the signal pulse A, and the leading edge of the pulse component F is in substantial time phase with the trailing edge of the pulse component G. These two pulse components are then fed into the time phase coincidence measuring unit generally indicated by the numeral 50, where the pulse components are separately compared for time coincidence with a range gate or range indicating pulse denoted by the waveform H as obtained from a time phasable range gate pulse generator 53. The time durations of the two outputs of this unit, indicated by the waveforms K and L, are compared with each other, and the difference in duration therebetween is a measure of the amount and direction by which the time center of the range gate or range indicating pulse H is out of time phase with the point on the time axis of the signal pulse at which it was split. The information thus obtained by the coincidence measuring unit may be fed back to the range gate pulse generator in any desired manner, as is well known to those skilled in the art, to adjust the time phase of the range gate pulse and thus effect continual coincidence of the range gate pulse with the signal pulse split. The time phase of the range gate pulse may then be compared with a suitable reference, as the echo pulse system's energy transmission trigger pulse, to provide a continual measure of object or target range.

Considering the drawing more specifically, the radar energy pulse, or the like, which is reflected by the object or target being tracked and received by the receiver of the echo pulse system, causes the production of an electrical signal pulse A, herein also referred to as the received signal pulse, having a shape, amplitude, time phase and time duration characteristic of the echo energy pulse. The received signal pulse A is applied to the tracking circuit at its input 11 and is coupled to the grid of the triode 14 through the capacitor 12 and across the input resistor 13. The resultant fluctuation of grid potential in triode 14 results in a negative pulse B at the plate of this triode. The peaking effect indicated by the waveform B is obtained by the parallel resistance 15 and capacitance 16 in the cathode circuit of triode 14. The significant aspects of waveform B as compared with waveform A are that the leading edge of the former is steepened and peaked with respect to the leading edge of the latter, while the leading edges of both impulses are in time phase. The pulse of waveform B is coupled through the capacitor 17 and across the resistor 18 to the grid of a second triode 19. Triode 19 is conducting in its plate circuit under stable state of the circuit; therefore, the application of the pulse B drives the grid of triode 19 negative, and the bias on this triode is so chosen that it is driven below its cutoff grid potential to produce a positive square wave pulse C at its plate. The leading edge of the square wave pulse C is in time phase with the leading edges of pulses A and B. Through this received pulse signal shaping unit 10, the received signal pulse A is thus converted into a sharp square wave pulse of limited amplitude.

The square wave pulse output of the received signal pulse shaping unit is fed into the received signal pulse splitting unit 30 through two separate channels 31 and 32. The pulse C entering channel 31 is coupled to the grid of the cathode follower triode 37 through the capacitor 33 and across the resistor 35, thus driving the grid potential of triode 37 positive and providing a square wave pulse output at point P of the cathode circuit of triode 37 substantially identical to the input pulse D and whose leading edge is in time phase with the leading edge of pulse D. Simultaneously with the application of pulse D to channel 31, the same pulse is applied to the parallel channel 32 of the splitting unit 30, which is coupled to the grid of triode 42 through the R-C differentiating circuit, comprising capacitor 34 and resistor 36, and the peaking circuit, comprising inductance 38 in parallel with capacitance 40. The resultant pulse applied to the grid of triode 42 is characterized by the waveform E, which shows that the square wave input has been partially differentiated and peaked to provide a positive pulse followed by a negative pulse. The widths of these pulses are adjusted to extend for a desired time interval as determined by the values of the elements included in the differentiating and peaking circuits afore-mentioned. Since the grid potential of triode 42 is established to place this tube at or below its grid cutoff potential under stable state of the circuit, the negative pulse of waveform E does not affect the plate or cathode output of this triode; but the positive pulse of waveform E does cause conduction through the triode 42 to provide a pulse at point P coincident with the positive pulse of waveform E, whose leading edge is in time phase with that of said positive pulse and with that of the square wave pulse C. Thus, the initiation of conduction in triode 42 is in time coincidence with the initiation of the pulse in the cathode circuit of triode 37, although the time duration of the former is substantially less than the time duration of the latter. The resistors 39 and 41 are chosen of appropriate values to provide a currentwise cancellation between the cathode output of triode 37 and the plate output of triode 42 at point P for the duration of the peak value obtained from the plate output of triode 42. As a result of this current interaction at point P, the output obtained along channel 47 is substantially of the characteristics indicated by the waveform F. It is to be noted that the major pulse of waveform F has a leading edge time delayed from the leading edge of pulse D, and hence of pulse A, by a fixed amount as determined by the time duration of the positive pulse of waveform E. Simultaneously with the application of pulse F along channel 47, the cathode circuit of triode 42 provides a pulse output as indicated by waveform G along channel 48. The major pulse of output G is substantially coincident with the positive pulse portion of waveform E, and its leading edge is therefore in time phase with the leading edge of the positive pulse of the waveform E and hence in phase with the leading edge of the received signal pulse A. It is to be noted that the trailing edge of the major pulse of waveform G is substantially in time phase with the leading edge of the major pulse of waveform F, and the time split in signal A thus accomplished is at a fixed time relation to the leading edge thereof as established by the peaking and timing circuit comprising inductance 38 and capacitance 40.

The pulse applied to channel 47 is coupled to the control grid of pentode 51 of the time phase coincidence measuring unit 50 through capacitor 43 and across resistor 45, while the pulse applied to channel 48 is coupled to the control grid of pentode 52 of said coincidence measuring unit through capacitor 44 and across resistor 46. The range gate or range indicating pulse indicated by the waveform H is obtained from a desired time phasable pulse generator 53 and coupled to the screen grids of the pentodes 51 and 52 simultaneously. The time phase of pulse H with relation to a chosen reference established by the echo pulse range finding system is a measure of the object or target range as last determined by the tracking circuit. In stable state condition of the tracking circuit, the two pentodes are cut off, and the bias thereon is such that it requires time coincidence in the application of the range gate pulse and the outputs of the received signal splitting unit 30 thereto cause conduction therethrough. Therefore, in order to obtain output pulses from both pentode coincidence measuring amplifiers 51 and 52, as indicated by waveforms K and L, the range gate pulse must be partially in time coincidence with both pulse components F and G of the received signal pulse A. If the time phase of the range gate pulse is the correct measurement of target range, the leading half of pulse H is in time coincidence with a trailing portion of pulse G, and the trailing half of pulse H is in time coincidence with an equal leading portion of pulse F. Under these conditions, the output pulses of pentodes 51 and 52, as indicated by waveforms K and L respectively, are substantially equal in amplitude and time duration. However, should the timing of pulse H be early for the correct measurement of target range, the output pulse L is correspondingly greater in time duration than the output pulse K; and should the range gate pulse H be late for the correct measurement of range, the output pulse K is greater in time duration than the output pulse L. Thus, the relation of output K to output L is a measure of the error in time phase of the range gate pulse H for indicating the correct object or target range, and by means well known in the art the afore-mentioned difference in output can be fed back to the range gate pulse generator to adjust the time phase of its output pulse to the correct measurement of target or object range. If the repetition frequency of received echo pulses is sufficiently great, it is apparent that the time phase of the range gate pulse can be continually adjusted by the present tracking circuit to provide a continual measurement or tracking of the selected object or target range.

It can thus be seen that the present invention provides a split signal range tracking circuit, which splits the received signal pulse at a predetermined and fixed point in time from its leading edge to provide a fixed reference along the received signal pulse to which phasing of the range gate pulse may be tied, the latter pulse thereby providing at output 54 a measure of object or target range when compared in time phase with suitable reference established by the echo pulse system. By tying the range reference in this manner, it is apparent that the range depth of the object or target cannot affect the accuracy of the range measurements. By the same token, attempts to lengthen the received echo pulses for defeating the range tracking measurements would likewise be innocuous to the accuracy of range tracking effected by the present circuit, because the fixed tracking point along the time axis of the received signal pulse is related to and controlled solely by the leading edge thereof. A further advantageous feature of the present invention resides in the fact that the instant circuit tracks the object or target at some point intermediate its leading and trailing edges in range, with the point so chosen being adjustable by properly choosing the values of elements 34, 36, 38, and 40 of the differentiating and peaking circuits above-described. Because of the intermediate point tracking thus provided, actual range errors incurred by the operational and inherent limitations of the echo pulse system and instant tracking circuit can be made relatively insignificant when the present circuit is employed either in a gun director or in the intelligence system of a guided missile.

The foregoing specific embodiment of the present invention is presented merely by way of example to enable a clearer understanding of the principles and concepts of the invention than would otherwise be possible. It is therefore not intended to limit the scope of the present invention to the precise details of the circuit above-described, but modifications thereof within the spirit and scope of the appended claims, as will be apparent to those skilled in the art, are within the contemplation of the present patent.

The present invention may be manufactured and used by or for the Government of the United States for governmental purposes without the payment of any royalties thereon or therefor.

What is claimed is:

1. A split signal object range tracking system for use in conjunction with echo pulse range finders, comprising in combination a received signal pulse shaping unit, a received signal pulse splitting unit, a time phase coincidence measuring unit, and a time phasable range indicating pulse generator; said shaping unit comprising a peaking circuit for steepening the edges of a received signal pulse, and a signal pulse amplitude limiter circuit for clipping the steepened edge signal in amplitude and providing a square wave signal pulse, connection means to connect the square wave signal pulse output of the pulse shaping unit to the input of the pulse splitting unit; said pulse splitting unit comprising two parallel channels, one including a cathode follower having its input connected to said connection means for transmitting the entire square wave pulse, and the other including a differentiator, a peaker, and an amplifier for transmitting a determined leading portion of the square wave pulse, said differentiator and said peaker being connected in series and disposed between said connection means and the input to said amplifier, the cathode of said amplifier being provided with an output connection to said measuring unit, coupling means providing from said amplifier anode a second output connection to said measuring unit and being disposed between said cathode follower cathode and amplifier anode, addition of voltages thereby cancelling the leading portion of the cathode follower output corresponding in time to the amplifier output, thereby splitting the squared signal pulse into early and late components from said output connections respectively; said measuring unit comprising two coincidence measuring amplifiers, means to apply one pulse component to a grid of one measuring amplifier and the other component to a grid of the other measuring amplifier, means to apply the output of said time phasable range indicating pulse generator to grids of both of said coincidence measuring amplifiers simultaneously for time phase comparison thereof with the two pulse components, the outputs of said measuring amplifiers being fed back to said generator for tying the time phase of the indicating pulse output thereof equal to coincidence with said signal pulse components.

2. A split signal object range tracking system for use in conjunction with echo pulse range finders, comprising in combination a received signal pulse shaping unit for forming an electrical signal pulse characterizing an echo pulse into an amplitude limited square wave pulse, a received signal pulse splitting unit, a time phase coincidence measuring unit, and a time phasable range indicating pulse generator; said pulse splitting unit comprising two parallel channels, the output of the signal pulse shaping unit being electrically connected to the input of each of the channels of the pulse splitting unit, one of said channels including a cathode follower for transmitting the entire square wave pulse output of the shaping unit, and the other including a differentiator, a peaker, and an amplifier for transmitting a determined leading portion of said square wave pulse, said differentiator and said peaker being disposed across the input of said amplifier, the cathode of said amplifier being provided with an output connection to said measuring unit, the plate of said amplifier being provided with a second output connection to said measuring unit, said follower cathode circuit and amplifier plate circuit being coupled through a common resistor for cancelling the portion of the cathode follower output corresponding in time to the amplifier output, thereby splitting the squared signal pulse into early and late components from said output connections respectively; said measuring unit comprising two coincidence measuring amplifiers, one pulse component being applied to a grid of one measuring amplifier and the other component to a grid of the other measuring amplifier, the output of said time phasable range indicating pulse generator being applied to grids of both of said coincidence measuring amplifiers simultaneously for time phase comparison with the signal pulse components, the outputs of said measuring amplifiers being fed back to said generator for tying the time phase of the indicating pulse output thereof to equal coincidence with said signal pulse components.

3. A split signal object range tracking system for use in conjunction with echo pulse range finders, comprising in combination a received signal pulse shaping unit for forming an electrical signal pulse characterizing the echo pulse into an amplitude limited square wave pulse, a received signal pulse splitting unit, a time phase coincidence measuring unit, and a time phasable range indicating pulse generator; said pulse splitting unit comprising two parallel channels, means to apply the output of the signal pulse shaping unit to the input of each of the channels of the pulse splitting unit, one of said channels including a cathode follower for transmitting the entire square wave pulse output of the shaping unit, and the other including a differentiator, a peaker, and an amplifier for transmitting a determined leading portion of said square wave pulse, said differentiator and said peaker being disposed across the input of said amplifier, the cathode of said amplifier being provided with an output connection for said measuring unit, the plate of said amplifier being provided with a second output connection for said measuring unit, said follower cathode circuit and amplifier plate circuit being coupled for cancelling the portion of the cathode follower output corresponding in time to the amplifier output, thereby splitting the squared signal pulse into early and late components from said output connections respectively; said measuring unit receiving the two pulse components and the output of said time phasable range indicating pulse generator for time phase comparison of the range indicating pulse output of said generator with the signal pulse components to indicate the change in the indicating pulse output time phase necessary for providing an accurate measure of object range.

4. A split signal object range tracking system for use in conjunction with echo pulse range finders comprising in combination: a signal pulse shaping unit for forming an electrical signal pulse characterizing the echo pulse into an amplitude limited square wave pulse; a signal pulse splitting unit having two channels, means to apply the output of the pulse shaping unit to the input of each of the channels of the pulse splitting unit, one channel including a cathode follower for transmitting the entire square wave pulse, the other channel including a differentiator, a peaker, and an amplifier for transmitting a determined leading portion of the square wave pulse, the differentiator and peaker being in series and disposed at the input to the amplifier, the cathode of said amplifier providing an output for said other channel to said measuring unit, said cathode follower and amplifier being coupled between the plate of the amplifier and the cathode of the cathode follower for cancelling the portion of the cathode follower output and providing an output for said one channel to said measuring unit corresponding in time to the amplifier output, thereby splitting the squared signal pulse into early and late component outputs from said other and one channels respectively; and a time phase coincidence measuring unit having input means electrically connected to the output of each of the channels and means to apply a time phasable range indicating pulse to the coincidence measuring circuit, said last-named circuit thereby comparing the time phase relationship of the signal pulse components with the time phasable range indicating pulse to determine the change in range indicating pulse time phase necessary for providing an accurate measure of object range.

5. A split signal object range tracking system for use in conjunction with echo pulse range finders comprising in combination: a signal pulse shaping unit for forming an electrical signal pulse characterizing the echo pulse into an amplitude limited square wave pulse; a signal pulse splitting unit having two channels each electrically connected to the output of the pulse shaping unit, one channel including means for transmitting the entire square wave pulse, the other channel including means for transmitting and inverting a determined leading portion of the square wave pulse, said two means being coupled at their outputs, additive effect of the coupling thereby causing cancelling the portion of the first-mentioned means output corresponding in time to the second-mentioned means output and providing an output of said first channel, said other channel having other means for providing an output of a determined leading portion of the square wave pulse thereby splitting the squared signal pulse into early and late components from said other and one channels respectively; and a time phase coincidence measuring unit having input means to take output of each of said channels and to introduce a time phasable range indicating pulse to the phase coincidence measuring unit, said last-named unit thereby comparing the time phase relationship of the signal pulse components with the time phasable range indicating pulse to determine the change in range indicating pulse time phase necessary for providing an accurate measure of object range.

6. A split signal object range tracking system for use in conjunction with echo pulse range finders comprising in combination: a received signal pulse splitting unit having two channels, one channel including a cathode follower for transmitting the entire signal pulse, the other of said channels including a differentiator, a peaker, and an amplifier for transmitting a determined leading portion of the signal pulse and providing a signal output of said other channel from said amplifier cathode, said differentiator and peaker being in series and comprising the input circuit to said amplifier, the outputs of said cathode follower and amplifier plate being coupled for cancelling the portion of the cathode follower output corresponding in time to the amplifier plate output providing the signal output of said one channel, thereby splitting the signal pulse into early and late components from said other and one channel outputs respectively; a time phase adjustable range gate pulse generator to generate range gate pulses; and a time phase coincidence measuring unit having inputs to receive the output of each of said channels and of said range gate pulse generator for comparing the time phase of a range gate pulse from said generator with said two signal pulse components to measure the time phase adjustment of the range gate generator necessary for bringing said range gate pulse into equal coincidence with the signal pulse components.

7. A split signal object range tracking system for use in conjunction with echo pulse range finders comprising in combination: a received signal pulse splitting unit having two channels, one channel including a cathode follower for transmitting the entire signal pulse, the other of said channels including an input differentiator, a peaker, and an amplifier, said differentiator and peaker being disposed at the input to said amplifier, said other channel transmitting a determined leading portion of the signal pulse from the amplifier cathode as the other channel output, said cathode follower cathode and amplifier plate being coupled for cancelling the portion of the cathode follower output corresponding in time to the amplifier output as the one channel output, thereby splitting the signal pulse into early and late components from said other and one channel outputs respectively; a time phase coincidence measuring unit having input means to take the output of each of said channels and input means to introduce range gate pulses into the last-named unit, said time coincidence measuring unit comparing the time phase of a range gate pulse with said two signal pulse components to measure the time phase adjustment of the range gate pulse necessary for bringing the same into equal coincidence with the signal pulse components.

8. A split signal object range tracking system for use in conjunction with echo pulse range finders comprising in combination: a received signal pulse splitting unit having two channels, one channel including a means for transmitting the entire signal pulse, the other of said channels including means for transmitting a determined leading portion of the signal pulse to first and second outputs, said two means being electrically coupled to each other at said first output for cancelling the portion of the first-mentioned means output corresponding in time to the second-mentioned means output, thereby splitting the signal pulse into early and late components from said second and first outputs respectively; and a time phase coincidence measuring unit having inputs respectively coupled to said first and second outputs, means for introducing range gate pulses into the unit, said unit comparing the time phase of a range gate pulse with said two signal pulse components to measure the time phase adjustment of the range gate pulse necessary for bringing the same into equal coincidence with the signal pulse components.

9. An electrical pulse splitting circuit comprising two parallel channels, one of said channels comprising a cathode follower, the other channel comprising a resistance-capacitance differentiating circuit, an inductance-capacitance peaking circuit, and an amplifier, the input of said one channel being coupled to the grid of the cathode follower, the input of the other channel being coupled through said differentiating and peaking circuits to the grid of the amplifier, the cathode circuit of said follower and the plate circuit of said amplifier being coupled through a common resistor, means to apply an electrical signal pulse to said channels simultaneously resulting in an output pulse in the cathode circuit of said amplifier for a leading fraction of the time duration of said signal pulse, as determined by said differentiating and peaking circuits, and an output pulse in the cathode circuit of said follower delayed for a time substantially equal to the time duration of said amplifier output pulse, thereby splitting said signal pulse into early and late pulses with the leading edge of the early pulse in time phase with that of the signal pulse and the leading edge of the late pulse time delayed substantially for the time duration of the early pulse, and output means disposed in the cathode circuit of said amplifier and of said follower to transmit said early and late pulses.

10. An electrical pulse splitting circuit comprising two parallel channels, a cathode follower and an amplifier, the input of one channel being coupled to the grid of the cathode follower, the input of the other channel, comprising an electrically joined differentiator and peaker, being coupled to the grid of the amplifier, the cathode circuit of said follower and the plate circuit of said amplifier being coupled through a common resistor, means to apply an electrical signal pulse to said channels simultaneously resulting in an output pulse in the cathode circuit of said amplifier for a leading fraction of the time duration of said signal pulse, as determined by said differentiator and peaker, and an output pulse in the cathode circuit of said follower counteracted by the plate output of said amplifier for a time substantially equal to the time duration of said amplifier output pulse, thereby splitting said signal pulse into early and late pulses with the leading edge of the early pulse in time phase with that of the signal pulse and the leading edge of the late pulse time delayed substantially for the time duration of the early pulse, and output means disposed in the cathode circuit of said amplifier and of said follower to transmit said early and late pulses.

References Cited in the file of this patent

UNITED STATES PATENTS

| | | |
|---|---|---|
| 2,118,626 | Smith | May 24, 1938 |
| 2,226,459 | Bingley | Dec. 24, 1940 |
| 2,442,769 | Kenyon | June 8, 1948 |
| 2,534,329 | Wilkerson | Dec. 19, 1950 |
| 2,559,666 | Schooley | July 10, 1951 |
| 2,577,536 | MacNichol | Dec. 4, 1951 |
| 2,600,185 | Ballard | June 10, 1952 |